United States Patent [19]

Boland et al.

[11] Patent Number: 5,872,972
[45] Date of Patent: Feb. 16, 1999

[54] METHOD FOR LOAD BALANCING A PER PROCESSOR AFFINITY SCHEDULER WHEREIN PROCESSES ARE STRICTLY AFFINITIZED TO PROCESSORS AND THE MIGRATION OF A PROCESS FROM AN AFFINITIZED PROCESSOR TO ANOTHER AVAILABLE PROCESSOR IS LIMITED

[75] Inventors: Vernon K. Boland, Lexington; Kevin R. Brasche, Irmo; Kenneth A. Smith, Prosperity, all of S.C.

[73] Assignee: NCR Corporation, Dayton, Ohio

[21] Appl. No.: 676,046

[22] Filed: Jul. 5, 1996

[51] Int. Cl.$^6$ .................................................. G06F 9/00
[52] U.S. Cl. ................................. 395/672; 395/675
[58] Field of Search .................. 395/680, 675, 395/670, 672, 671

[56] References Cited

U.S. PATENT DOCUMENTS

| 4,432,051 | 2/1984 | Bogaert ................................... 364/200 |
| 4,748,558 | 5/1988 | Hirosawa et al. ....................... 364/200 |
| 5,053,950 | 10/1991 | Naganumau et al. ................... 364/200 |
| 5,115,505 | 5/1992 | Bishop et al. ........................... 395/650 |
| 5,185,861 | 2/1993 | Valencia ................................... 395/200 |
| 5,239,649 | 8/1993 | McBride et al. ........................ 395/650 |
| 5,283,897 | 2/1994 | Georgiadis et al. ..................... 395/650 |
| 5,317,738 | 5/1994 | Cochcroft, Jr. et al. ................. 395/650 |
| 5,355,372 | 10/1994 | Sengupta et al. ....................... 370/60.1 |
| 5,506,987 | 4/1996 | Abramson ................................ 395/650 |

*Primary Examiner*—Majid A. Banankhah
*Attorney, Agent, or Firm*—James M. Stover; Charlene Stukenborg

[57] ABSTRACT

An improved affinity process scheduling method for a multiprocessor computer system, wherein a process previously executed on a processor within the computer system is affined to the processor on which it previously executed, and will be scheduled for execution by the affined processor during subsequent requests for execution of the affined process. The improved affinity process scheduling method monitors the length of time the affined process resides on the system run queue awaiting execution by its affined processor; and schedules the affined process for execution with another available processor when the length of time the affined process has been waiting for execution exceeds a predetermined "steal-age" threshold. The improved affinity process scheduling method also monitors the processing load borne by the affined processor, determines therefrom a headroom parameter for the affined processor, the headroom parameter indicating the remaining load capacity of the affined processor; and schedules the affined process for execution with another available processor when the headroom of the affined processor is less than a predetermined "low-headroom" threshold.

9 Claims, 7 Drawing Sheets

FIG. 7 ly, to a method for improving load balancing within an SMP system utilizing affinity process scheduling.

METHOD FOR LOAD BALANCING A PER PROCESSOR AFFINITY SCHEDULER WHEREIN PROCESSES ARE STRICTLY AFFINITIZED TO PROCESSORS AND THE MIGRATION OF A PROCESS FROM AN AFFINITIZED PROCESSOR TO ANOTHER AVAILABLE PROCESSOR IS LIMITED

The present invention relates to Symmetric Multi-Processing (SMP) systems and, more particular

BACKGROUND OF THE INVENTION

In Symmetric Multi-Processor (SMP) systems, it is desirable for long-running processes to continue to run on the same processor so that their working set of data and text will remain in a single processor's cache. When a process migrates from one processor to another, it must re-load its working set of text from main memory (provided that they are not already resident in the new processor's cache) and it must transfer its working set of modified data from the old processor's cache into the new processor's cache. These loading and transfer operations can be very time consuming depending on the amount of data to be transferred, the bandwidth and utilization of the processor-memory bus, and the access latency of main memory. The Operating System's process scheduler is responsible for determining which processes run on which processor at any given point in time. In order to maintain fair access to the system by all processes, the scheduler maintains a separate priority and time-slice length for each process. In general, the higher priority processes are run before the lower priority processes, but they are also given a shorter "time-slice" of the processor in order to maintain fair access to the system. The scheduler uses the Run-Time-Invariant (RTI) principle, which states that at any given point in time, the processes running on the processor's will be the highest priority system-wide runnable processes, to ensure system-wide fairness for all processes.

In order to minimize process migration between processors, the process scheduler can be enhanced to give individual processes "affinity" to a particular processor. One such method of scheduling processes is disclosed in U.S. Pat. No. 5,185,861 to Valencia, issued Feb. 9, 1993, and entitled "Cache Affinity Scheduler". In that patent, an affinity scheduler for a multi-processor computer system is disclosed. The affinity scheduler allocates processors to processes and schedules the processes to run based upon the bases of priority and processor availability. The scheduler uses the estimated amount of cache context to decide which run queue a process is to be enqueued. U.S. Pat. No. 5,185,861 is hereby incorporated by reference.

Difficulties can arise when processes are given strict affinity to processors, however. For instance, processes of differing priority levels may become unevenly distributed among processors, whereby some processors may have a group of high priority processes competing for runtime, while other processors have a group of lower priority processes competing for runtime. In this situation, the system wide RTI principal of executing the highest priority runnable processes will be violated as not all of the highest priority processes are given preference over lower priority processes. Most implementations of affinity schedulers will tolerate small violations of the RTI principal in order to gain the performance improvements provided by giving processes affinity to processors. Instead of implementing a system wide RTI policy, these affinity schedulers will implement a per-processor RTI policy and attempt to achieve system wide fairness by employing a load balancing algorithm.

In order to ensure a uniform distribution of processes to processor's, traditional affinity schedulers utilize three load-balancing techniques:

1. New processes are placed on a global run queue. Since all processor's periodically check the global queue, the processors that are more idle will tend to check the global queue more often, achieving load balancing for new processes.
2. Processes that have not run on a given processor for some period of time are "aged" via some tunable metric (such as number of context switches or clock ticks since the time the process was last run). When the age of a process exceeds some threshold, the process loses its affinity to that processor, since it is assumed that its working set of text and data have been replaced by those of other processes. In this case, the process is put back on the global queue when it is ready to run again.
3. Dynamic loading problems are detected by periodically examining the run queue lengths of each processor and stealing processes from processors having run queue lengths significantly greater than the average, system wide run queue length.

There are two problems with the load balancing techniques described above. First, the aging threshold discussed in item (2) above is a fixed value and as such cannot take into account that different processes can have different size working sets. Therefore, any reasonably small value will cause a performance degradation for classes of processes with large working sets. Furthermore, a fixed value does not take into account the fact that cache sizes may vary from system to system or even from processor to processor. Second, the queue-length based technique used for dynamic load balancing described in item 3 above does not take into consideration the "weight" of the processes in the run queue, wherein the weight of a process relates to the intensity of the processor use required by the process.

OBJECTS OF THE INVENTION

It is therefore an object of the present invention to provide a new and useful method for improving load balancing within a multiprocessor computer system.

It is another object of the present invention to provide such a new and useful method wherein migration of processes between processors is strictly controlled to improve cache memory utilization and reduce memory and system bus traffic.

It is yet another object of the present invention to provide such an affinity process scheduling system for a multiprocessor computer system.

It is still a further object of the present invention to provide such a scheduling system wherein processes are strictly affinitized to processors and migration of a process from an affinitized processor to an available processor is limited to improve cache memory utilization and reduce memory and system bus traffic.

SUMMARY OF THE INVENTION

There is provided, in accordance with the present invention, an improved affinity process scheduling method for a multiprocessor computer system, wherein a process previously executed on a processor within the computer system is affined to the processor on which it previously executed and will be scheduled for execution by the affined processor during subsequent requests for execution of the affined process.

The improved affinity process scheduling method monitors the length of time an affined process resides on the system run queue awaiting execution by its affined processor; and schedules the affined process for execution with another available processor when the length of time the affined process has been waiting for execution exceeds a predetermined "steal-age" threshold. The improved affinity process scheduling method also monitors the processing load borne by the affined processor, determines therefrom a headroom parameter for the affined processor, the headroom parameter indicating the remaining load capacity of the affined processor; and schedules the affined process for execution with another available processor when the headroom of the affined processor is less than a predetermined "low-headroom" threshold.

The above and other objects, features, and advantages of the present invention will become apparent from the following description and the attached drawings.

DETAILED DESCRIPTION OF THE PREFERRED EMBODIMENT

Figure 1:
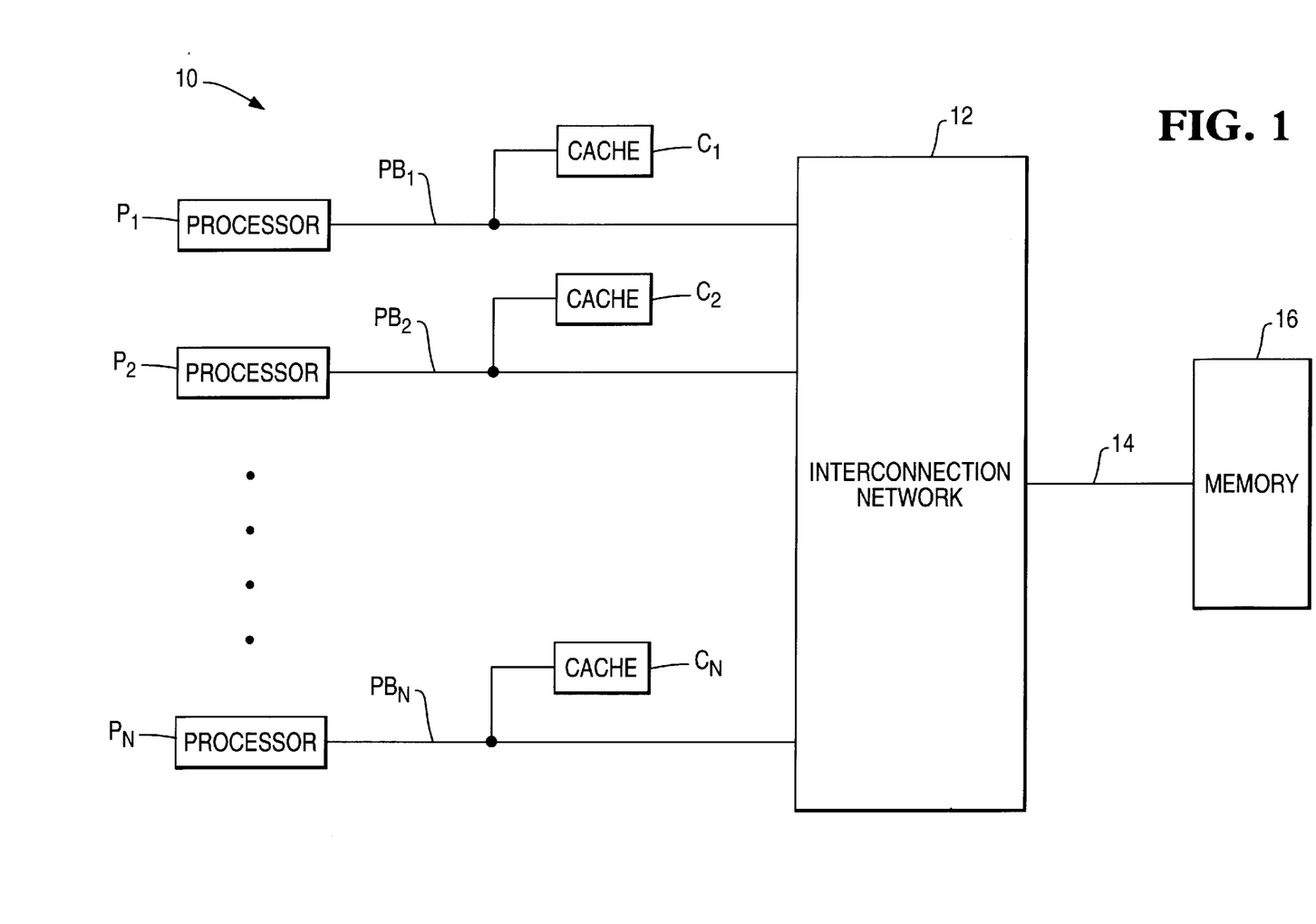
FIG. 1 is a simplified block diagram of a computer system having P processors.

Referring now to FIG. 1, a representative computer system 10 having multiple processors $P_1$ through $P_N$ and employing a process affinity scheduling system is shown. Each of the processors $P_1$ through $P_N$ has a respective cache memory $C_1$ through $C_N$ attached thereto. Each of the processors $P_1$ through $P_N$ is connect via a respective processor bus $PB_1$ through $PB_N$ to a system interconnect network 12, for example a parallel system bus. The interconnect network 12 is also connected to a common system memory 16 via a memory bus 14. The common memory 16 may be accessed by any of the processors $P_1$ through PN via the interconnect network 12.

The advantages offered by the use of cache memories to improve system speed, allowing processors to operate effectively at the faster speed of the cache memory rather than at the slower speed of a conventional DRAM main memory, are well known. A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories within a multi-processor system, however, provides additional advantages. System performance is improved through more efficient utilization of the memory or system buses. Traffic on the memory bus is reduced. Each data read and write operation need not involve main memory, rather data can be exchanged between the cache and main memory when convenient through the execution of burst cycles.

The system 10, unless preventive measures are taken, will be prone to random process migration.

A block diagram illustrating the major elements of an affinity scheduler utilized within a multiprocessor system, such as the system described above, is provided in FIG. 2. Scheduler 22 schedules all runnable processes in global run queue 24, including new processes as well as processes which have been previously run and are now affinitized to a specific processor. These processes may thereafter be reordered based upon process priority within a global priority run queue 26. Within priority levels processes are placed in a first-in-first-out (FIFO) order.

Figure 2:
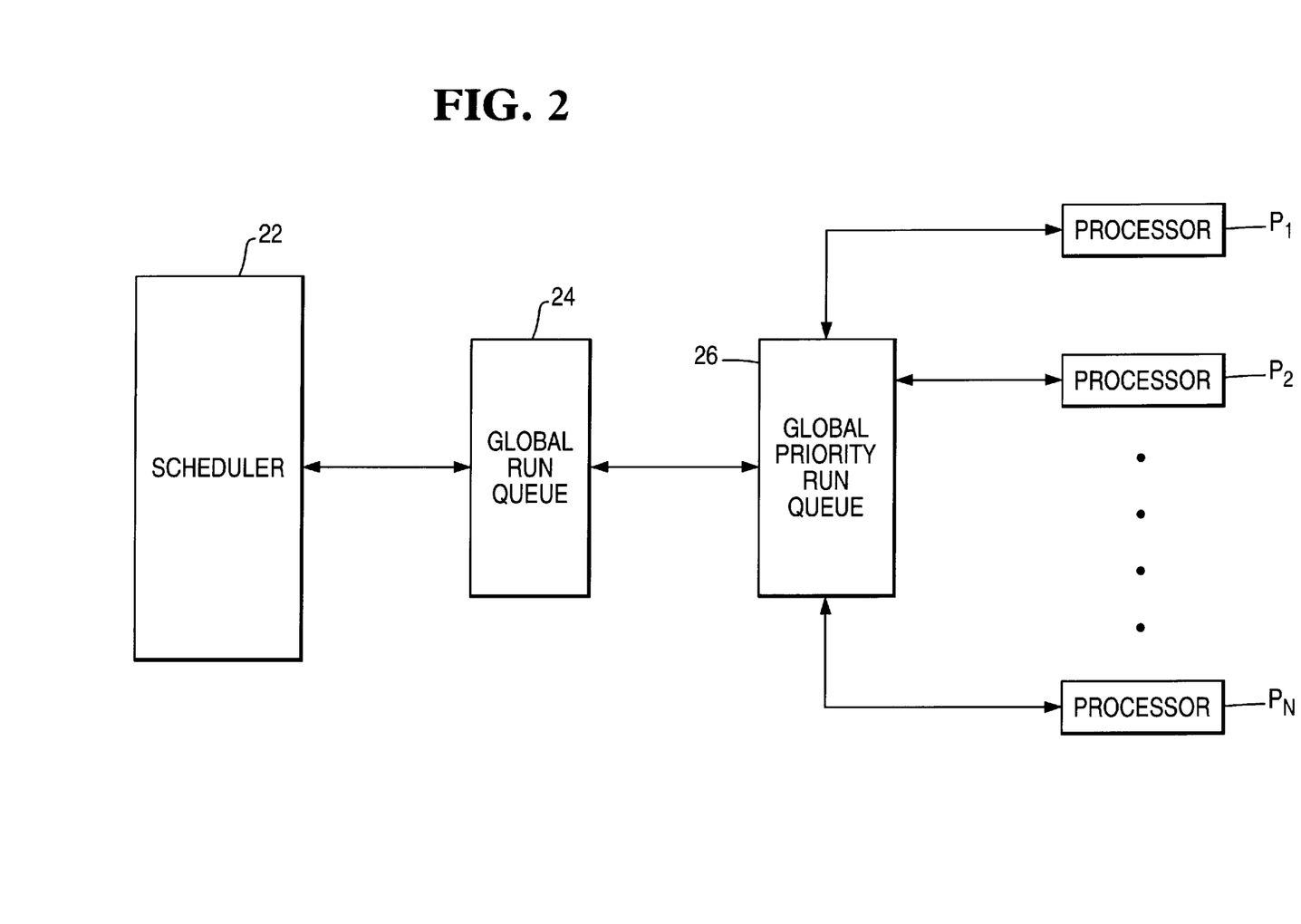
FIG. 2 is a simplified block diagram illustrating the major elements of an affinity scheduler utilized within a multiprocessor system, such as the system of FIG. 1.

During operation, each processor, when it becomes available, will consult the global priority run queue 26 to determine which process it will next execute. One known affinity scheduling procedure for determining process execution is illustrated in the flow diagram of FIG. 3.

Figure 3:
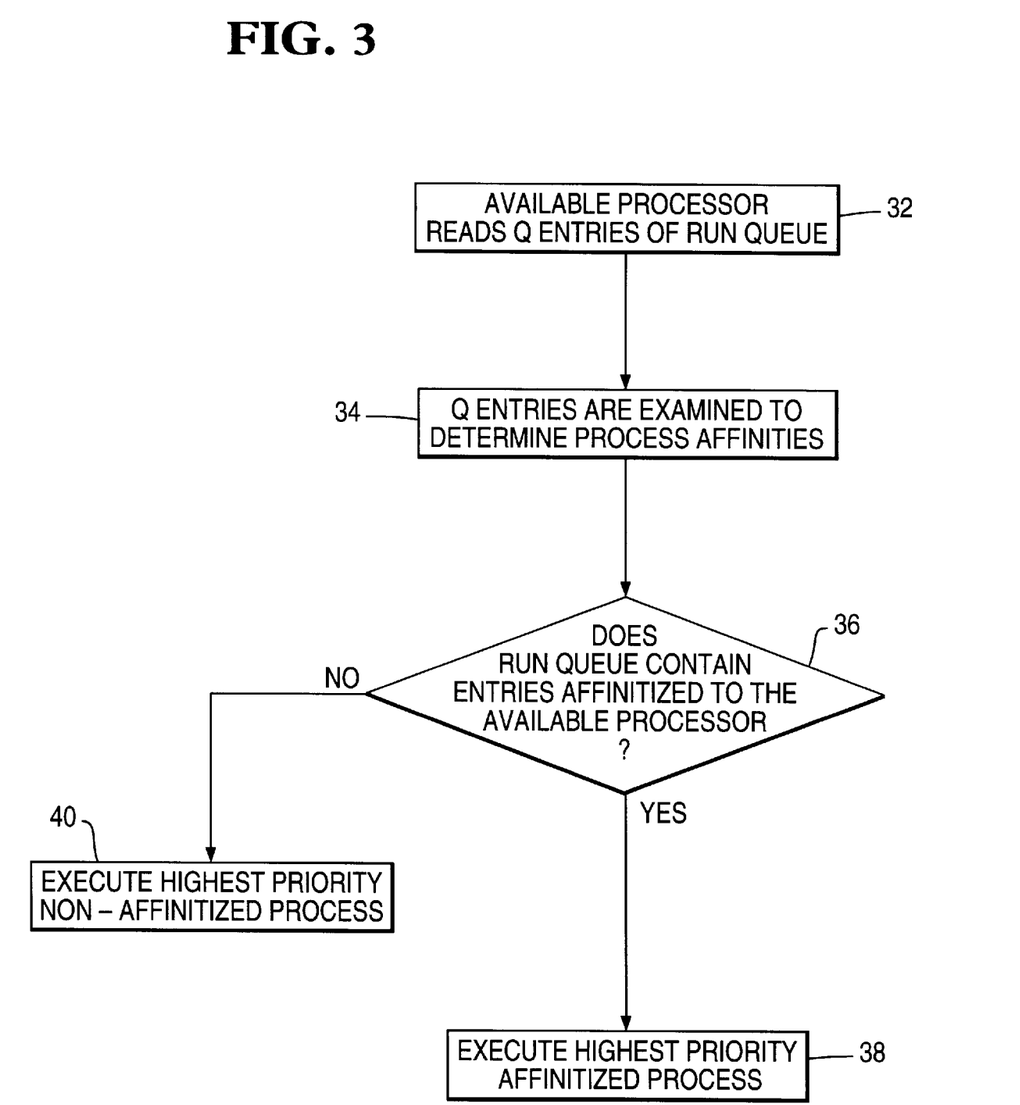
FIG. 3 is a low diagram showing a method of operating an affinity scheduler without application of the present invention.

Referring now to FIG. 3, as a processor $P_1$-$P_N$ becomes available to receive and execute another process, it reads the queue entries contained within global priority run queue 26 (step 32). Each previously executed process entered into the global priority run contains information identifying the processor to which the process is affinitized. The queue entries read during step 32 are examined to identify processes affinitized to the available processor (step 34). If one or more of the entries read from the run queue is determined to be affinitized to the available processor then the highest priority entry identified as affinitized to the processor will be executed by that processor (steps 36 and 38). If no entries are determined to be affinitized to the processor then the highest priority non-affinitized process identified in run queue 26 will be executed (steps 36 and 40). This highest priority non-affinitized process may be a new process or a process affinitized to another processor, in which case the process will yield its affinity to the other processor and be "stolen" by the available processor.

The present invention provides a new paradigm for achieving process load balancing in the affinity scheduler that does not depend on processes willingly yielding their affinity to processors. This paradigm achieves the initial load balancing of new processes via the traditional model of placing them on the global run queue, assuming that the processor's that have more idle time will be more likely to run the process than those that have less idle time. However, once a processor runs a process, it would never age away its affinity from that processor. This paradigm states that a process' processor affinity should be changed ONLY if there is a load-balancing problem, which will manifest itself as either a latency or a throughput problem. A latency problem can be detected if a process has been on the run queue longer than a certain threshold without being run. A throughput problem can be detected if a processor has "headroom" that is below a certain threshold, where "headroom" is defined as the amount of idle or waiting-on-IO time that the processor accumulated during a recent window of time. For example, if processor A has headroom that is less than a given threshold (for example, 5% of the total time elapsed in the window), then it is nearing a throughput problem, and processor's with more headroom should steal processes from processor A until its headroom comes below the threshold. Note that the stealing processors must have headroom above a different threshold (for example 20% of the total time elapsed in the window) in order to steal a process from a processor with low headroom. This restriction prevents excessive process stealing in very busy systems.

Figure 4:
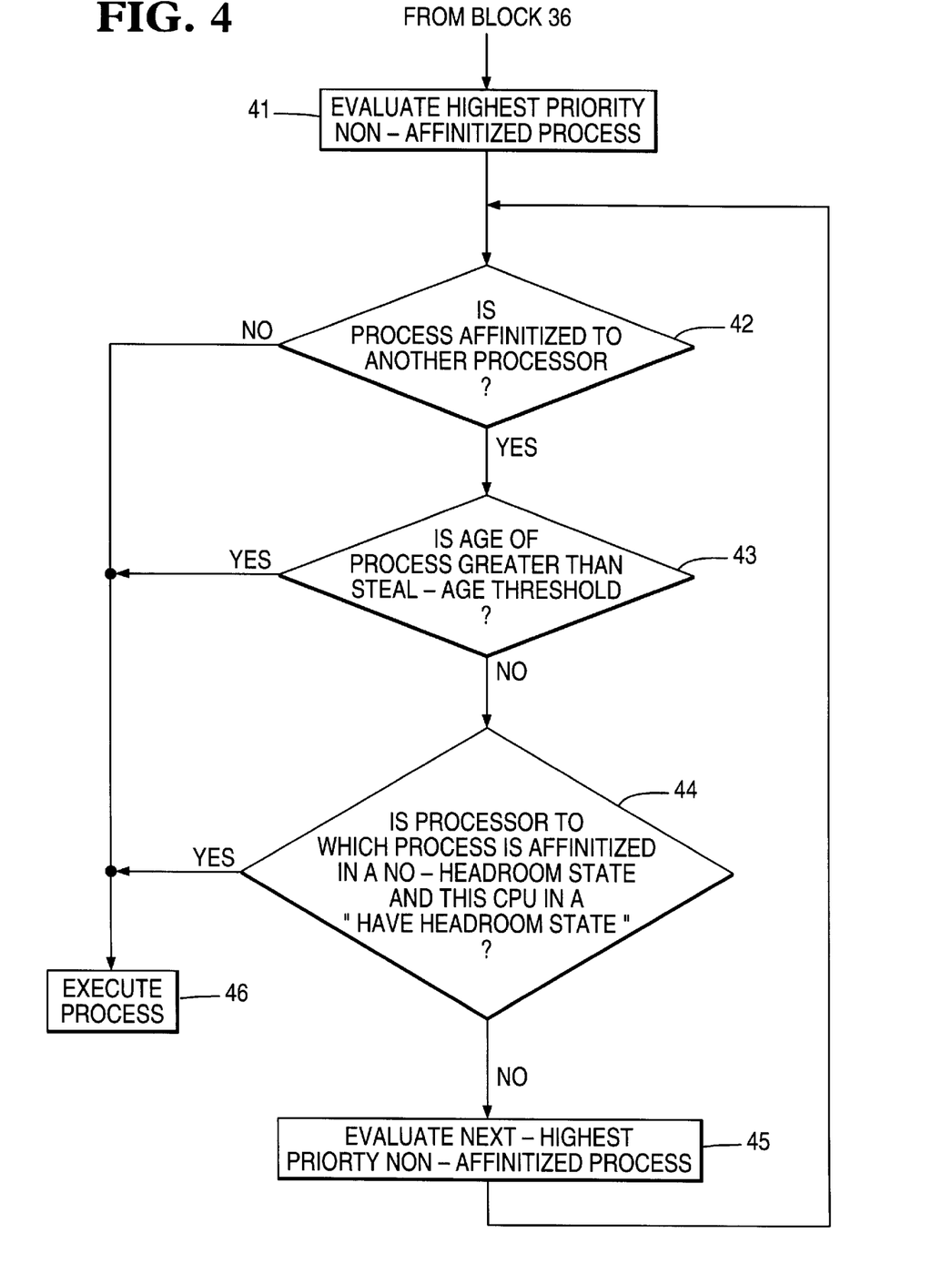
FIG. 4 is a flow diagram showing one method of operating an affinity scheduler in accordance with the present invention.

FIG. 4 illustrates a modification of the process affinity scheduling procedure shown in FIG. 3 which results in a process affinity scheduler in accordance with the present invention. Steps 41 through 46 replace step 40 of FIG. 3. The modified scheduling procedure directs the execution of a non-affinitized process only when one of the following conditions is satisfied:

1. The non-affinitized process has no affinity to another processor, e.g., a new process;
2. The age of the non-affinitized process is greater than a predetermined "steal-age" threshold; or
3. The processor to which the non-affinitized process is affinitized is in a "no-headroom" state.

The implementation of the enhanced scheduler requires the addition of infrastructure code to generate and update the headroom statistics as well as changes to the logic that selects which dispatcher queues to evaluate and which process to choose to run.

The infrastructure that implements the "headroom" statistics as described above is comprised of two routines. The first routine, titled headroominit() presented in pseudo-code below, is called from the process scheduler main program and is believed to be self-explanatory.

---

Headroom Initialization Routine

```
headroominit()
{
    register int i;
    for (i=0; i<ncpumax; I++){
        myHeadroom[i] = 0;
        myStat[i] = HaveHeadroom;
    }
    haveHeadroomThresh = affintune.HaveHeadroomThresh*
    affintune.LoadBalanceFreq;
    noHeadroomThresh = affintune.NoHeadroomThresh*
    affintune.LoadBalanceFreq;
    if(affintune.CacheWarmth == GuessByIdleCounts) {
        headroom-update();
    }
}
```

---

The second routine, titled headroom—updates, which is executed every affintune.LoadBalanceFreq seconds, computes the headroom for each processor from the sum of idle and waiting-on-IO time accumulated during a recent window of time. From these statistics, processors are given a "NoHeadroom", "LowHeadroom", or "HaveHeadroom" status.

---

Headroom Update Routine

```
headroom_update()
{
    extern pl_t plhi;
```

---

Headroom Update Routine

```
    register int i;
    register time_t new;
    register unsigned long diff;
    for (i=0; i<ncpumax; i++) {
        if (!cpu_isonline(i))
            continue;
        new = perpup[i]->c_sysinfo.cpu[CPU-WAIT] +
            percpup[i]->c_sysinfo.cpu[CPU_IDLE];
        diff = new - myHeadroom[i];
        if (diff<noHeadroomThresh)
            myStat[i] = NoHeadroom;
        else if (diff > = haveHeadroomThresh)
            myStat[i] = HaveHeadroom;
        else
            mystat[i] = LowHeadroom;
        myHeadroom[i] = new:
    }
    dqStealAge = affintune.dispqStealAge + globalrqlen;
    (void)itimeout(headroom_update, O, affintune.
LoadBalanceFreq* HZ, plhi);
}
```

---

The dqStealAge variable, set in the headroom update() routine, shown in pseudo code above, is used as the threshold value above which processes can be stolen due to long latencies on the global run queue. The length of time processes are required to wait on the global run queue, dqStealAge, is a function of the global run queue length. A threshold value high enough to prevent latency steals from destroying the benefits of affinity, but low enough to prevent egregious process latencies on the dispatch queue is desired. It has been determined that setting the run queue "steal-age" threshold to a value which limits the number of processes which will be stolen for latency reasons to 0.5% provides the benefits discussed above.

Figure 5:
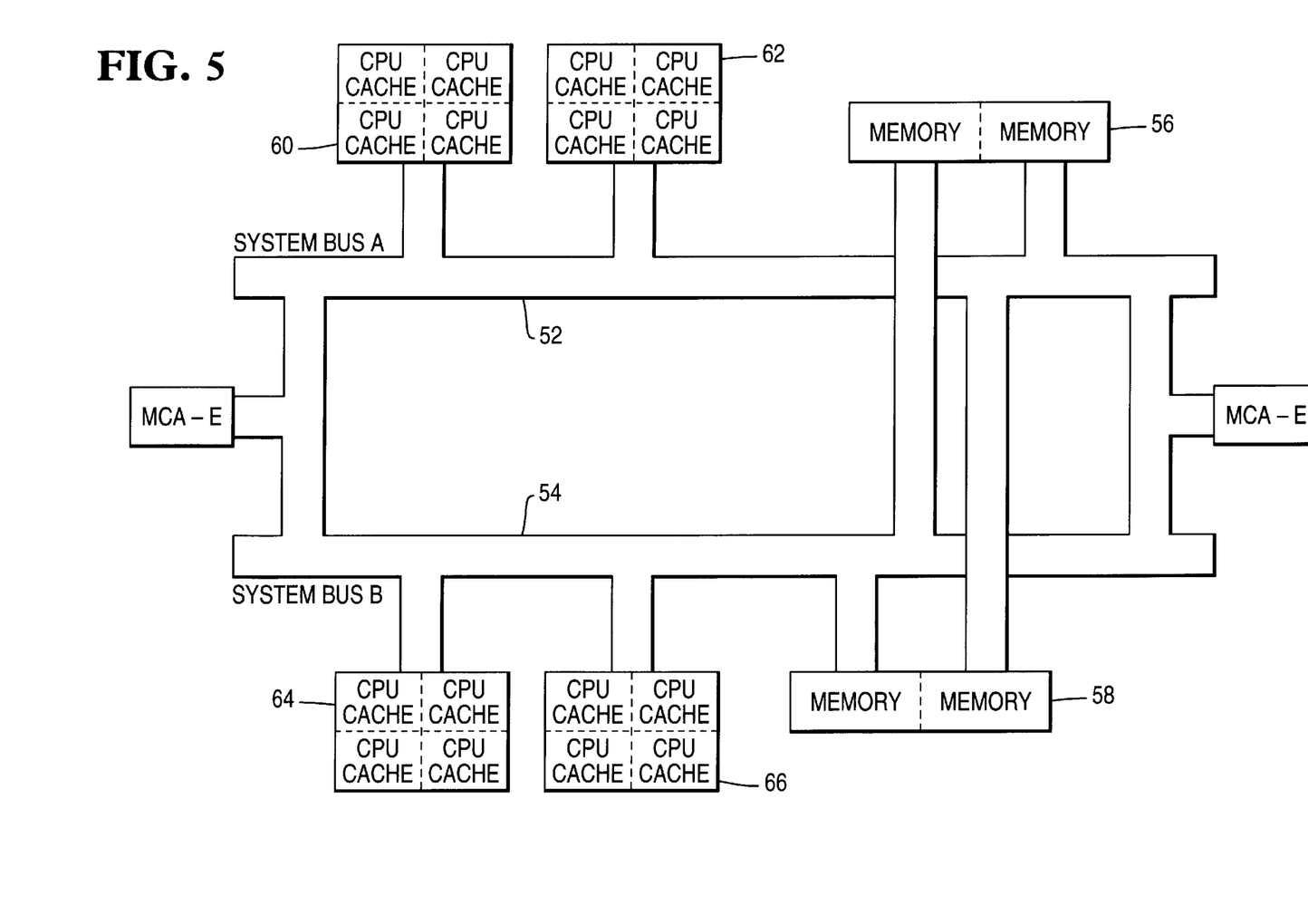
FIG. 5 is a block diagram representation of a scaleable system architecture including multiple processor nodes, each node containing multiple processors.

A more complicated multiprocessor architecture to which the above described invention may also be applied is shown in FIG. 5. Referring now to FIG. 5, there is seen a multiprocessor system architecture employing dual split-transaction memory or system busses 52 and 54, two dual-ported system memory modules 56 and 58 connected between the two system busses, two processor boards 60 and 62 connected to system bus 52, and two processor boards 64 and 66 connected to system bus 54. In the architecture shown in FIG. 5, each one of processor boards 60, 62, 64 and 66, referred to herein as Quad boards, contains four processors as shown in FIG. 6.

The processors on processor board 60, identified by reference numerals 601, 602, 603 and 604, are interconnected through a data pathway called a disconnect bus 606, used exclusively for inter-processor communication. This bus is also called a nodal-bus, or n-bus. From the perspective of the system busses 52 and 54, each Quad board resembles a single processor attached to one of the dual system buses.

Figure 6:
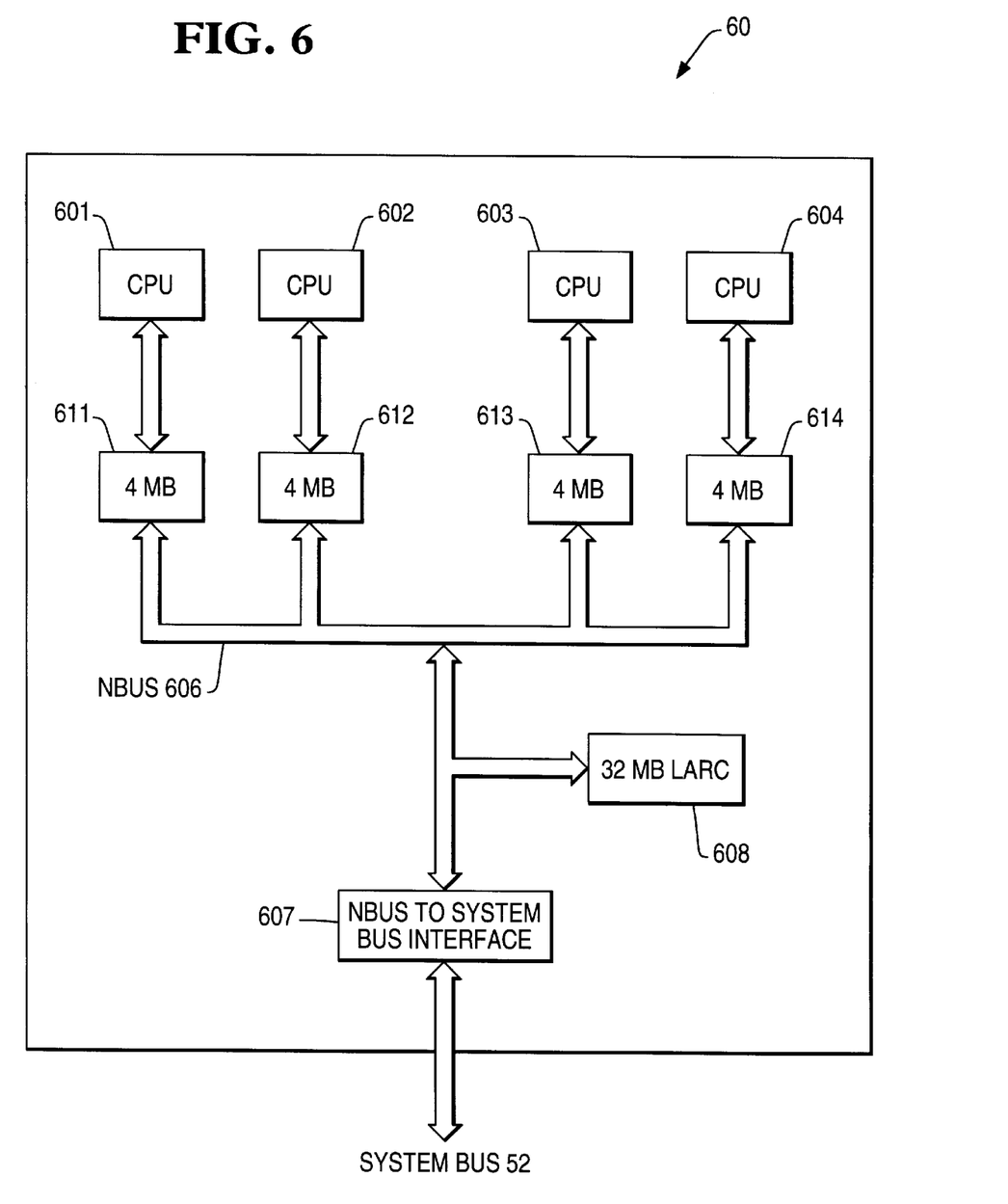
FIG. 6 is a block diagram representation of the architecture included in one of the processor nodes shown in FIG. 6.

In addition to an internal first level cache included within each processor, an external second level cache memory, shown in FIG. 6 as having a size of 4 megabytes and identified by reference numerals 611, 612, 613 and 614, is associated with each of processors 601, 602, 603 and 604, respectively.

Within each Quad board, the four processors use a bus snooping protocol on the n-bus. Bus snooping is a method of keeping track of data movements between processors and memory. There are performance advantages to this system with a small number of tightly-coupled processors. If a processor needs data that is available in the cache of another processor on the same Quad board, the data can be shared by both processors. Otherwise, the data must be retrieved from main memory, a more time consuming operation which requires system bus traffic. This method enhances system performance by reducing system bus contention.

To store heavily used sections of system memory, such as the operating system kernel and database executable files, a Limited Address Range Cache (LARC) 608 is sharable among all four processors on a Quad board. The operating system can command the LARC to map any read from designated address ranges in main system memories 56 and 58. These addresses, once fetched, are cached into LARC memory 608 and most likely do not ever need to be re-fetched from memories 56 and 58. This architecture reduces traffic on the system bus and effectively increases the system bus bandwidth.

Figure 7:
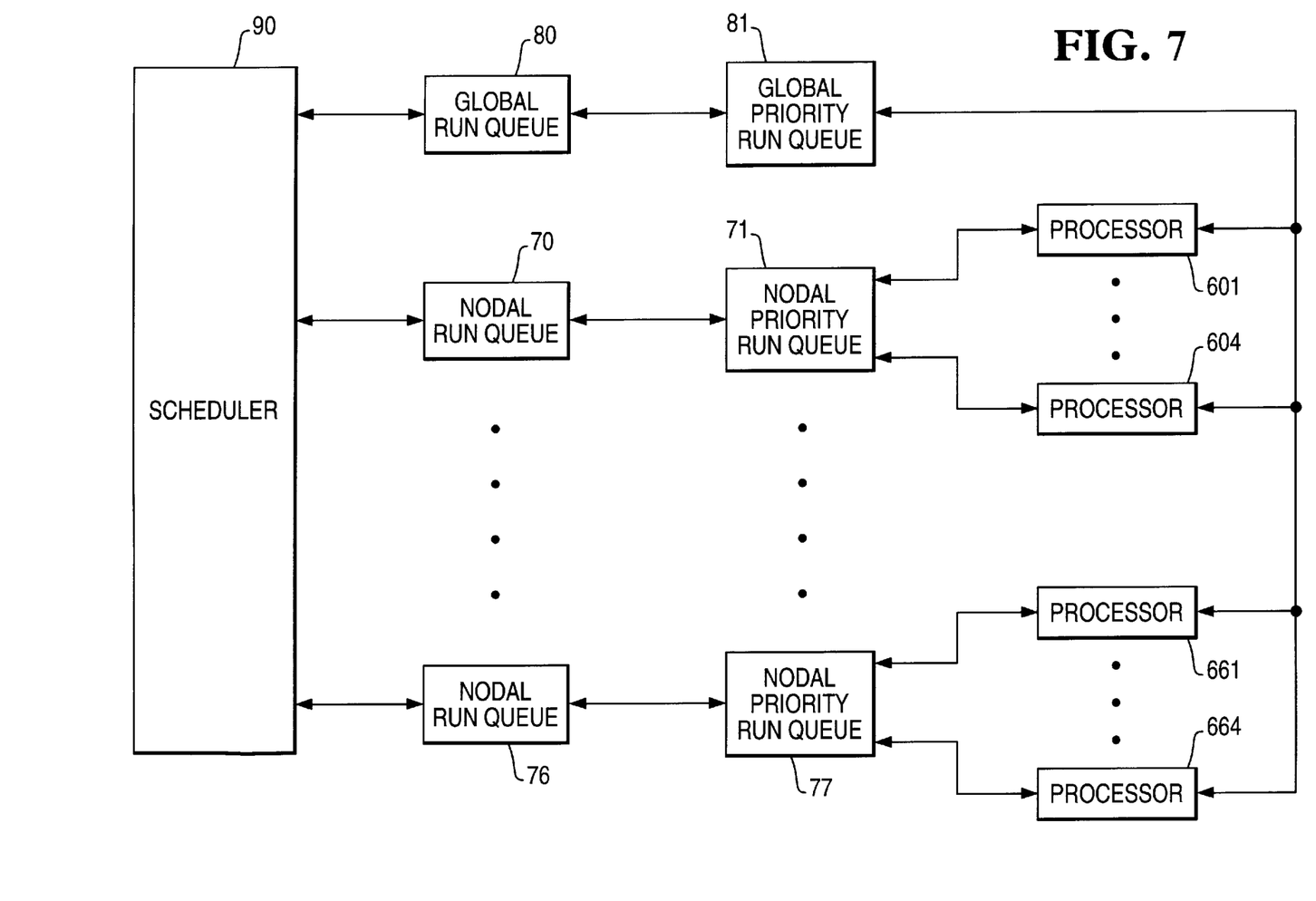
FIG. 7 is a simplified block diagram illustrating the major elements of an affinity scheduler utilized within the multiprocessor system of FIGS. 5 and 6.

A block diagram illustrating the major elements of an affinity scheduler utilized within the system illustrated in FIGS. 5 and 6 is provided in FIG. 7. The affinity scheduler system shown in FIG. 7 includes a nodal run queue 70 through 76 for each processor node in addition to the global run queue 80. Scheduler 90 schedules new processes in global run queue 80. Previously run processes are written to the nodal run queue associated with the processors to which processes are affinitized. For example, a process affinitized to processor 601 will be scheduled in nodal run queue 70, and a process affinitized to processor 664 will be scheduled in nodal run queue 76. However a process having no affinity is scheduled in global run queue 80. These processes may thereafter be reordered based upon process priority within a nodal priority run queues 71 and 77 and global priority run queue 81, respectively. Within priority levels processes are placed within their queues in a first-in-first-out (FIFO) order.

During operation, each processor, when it becomes available, will consult the global priority run queue and the nodal run queues to determine which process it will next execute. A method for scheduling processes within a multiple-node, multiprocessing system, such as the system illustrated in FIGS. 5 and 6 is disclosed in U.S. patent application Ser. No. 08/508,017, titled "CACHE AFFINITY SCHEDULING METHOD FOR MULTI-PROCESSOR NODES IN A SPLIT TRANSACTION BUS ARCHITECTURE," by Todd C. Davis. U.S. patent application Ser. No. 08/508,017, filed on Jul. 7, 1995, and assigned to the assignee of the present application, is hereby incorporated by reference.

The enhanced affinity scheduler builds on top of the nodal dispatch queue infrastructure of the existing affinity scheduler shown in FIG. 7. The enhanced scheduler first checks the global queue if its maximum priority is greater than the minimum priority of the nodal queue. This can be a violation of the RTI if the nodal queue has a maximum priority that is greater than that of the global queue. But since the available processor has no way of knowing if any of the nodal processes are affinitized to himself, and since only new processes are ever on the global queue, the global queue is checked first. Next the local nodal queue is examined. If the available processor were unable to find a process to run on the nodal queue and had previously skipped the global queue, the global queue would then be checked. If at this point no process has been discovered to run, the other nodal queues will be examined, but only if one of the following two conditions are satisfied:

1. There is only one online processor on the other node; or
 2. The number of processes on the other nodal queue minus the number of processes on my nodal queue is greater than a preset threshold.

Regardless of which queue was selected to be evaluated, they are all evaluated in the same manner. This routine is identical to the previous affinity scheduler in every aspect except in evaluating a process to steal. An available processor will first scan the entire queue looking for a process affinitized to the current processor. If none is found, the first process in the list is evaluated as a candidate to steal. Whereas the original affinity scheduler would steal this process unconditionally, the enhanced scheduler will steal it only if one of the following two conditions are met:

1. The age of the non-matching process is greater than a predetermined "steal-age" threshold; or
 2. The processor to which the non-matching process is affinitized is an a "no-headroom" state.

It can thus be seen that there has been provided by the present invention an improved affinity process scheduling system for a multiprocessor computer system wherein processes are strictly affinitized to processors and the migration of a process from an affinitized processor to another, available, processor is limited to improve cache memory utilization and reduce memory and system bus traffic.

Although the presently preferred embodiment of the invention has been described, it will be understood that various changes may be made within the scope of the appended claims.

What is claimed is:

1. An improved affinity process scheduling method for a multiprocessor computer system, whereby a process previously executed on a first processor within said computer system is affined to said first processor and will be scheduled for execution by said first processor during a subsequent request for execution of said affined process, the improvement comprising the steps of:

receiving a request from a second processor for a process to run, said second processor having no currently runnable process which is affined with said second processor;

monitoring the length of time said affined process has been waiting for execution by said first processor when said affined process has been scheduled for execution; and scheduling said affined process for execution with said second processor when said length of time said affined process has been waiting for execution by said first processor exceeds a predetermined "steal-age" threshold.

2. An improved affinity process scheduling method for a multiprocessor computer system, said affinity process scheduler for scheduling a process previously executed on a first processor to said first processor during a subsequent requests for execution of said process, the improvement comprising the steps of:

receiving a request from a second processor for a process to run, said second processor having no currently runnable process which is affined with said second processor;

monitoring the processing load borne by said first processor and determining therefrom a headroom parameter for said first processor, said headroom parameter indicating the remaining load capacity of said first processor; and scheduling said affined process for execution with said second processor when the headroom of said first processor is less than a first predetermined "low-headroom" threshold.

3. An improved affinity process scheduling method for a multiprocessor computer system, said affinity process scheduler for scheduling a process previously executed on a specific processor to said specific processor during a subsequent requests for execution of said process, the improvement comprising the steps of:

monitoring the processing load borne by said affined processor and determining therefrom a headroom parameter for said affined processor, said headroom parameter indicating the remaining load capacity of said affined processor; and     scheduling said affined process for execution with another available processor when the headroom of said affined processor is less than a first predetermined "low-headroom" threshold     wherein said step of scheduling said affined process for execution with another available processor occurs when said available processor has headroom greater than a second predetermined "low-headroom" threshold, said second low-headroom threshold being greater than said first low-headroom threshold.

4. A method for scheduling the execution of processes within a multi-processor computer system, the method comprising the steps of:

A. enqueuing processes received by said computer system into a run queue;

B. maintaining a record of previously executed processes and the processors on which said previously executed processes were run;

C. monitoring the length of time each process resides on said run queue;

D. examining the first process in said run queue upon a request from an available processor for a process to run, said available processor having no currently runnable process which is affined with said available processor;

E. examining said record of previously executed processes to determine if said first process has been previously executed on a processor other than said available processor;

F. assigning said first process to said available processor for execution if said first process has not been previously executed on a processor other than said available processor;

G. assigning said first process to said available processor for execution if said first process has been previously executed on a processor other than said available processor and the length of time said first process has been enqueued within said run queue exceeds a predetermined "steal-age" threshold;

H. assigning said first process to said available processor for execution if said first process has been previously executed on a processor other than said available processor and said other processor has headroom below a predetermined "low-headroom" threshold; and     I. repeating steps D through H for a second process in said run queue.

5. The method for scheduling the execution of processes within a multi-processor computer system according to claim 4, wherein:

each process within said run queue has a priority level associated therewith; and     said processes are arranged in said run queue in order of their priority levels.

6. The method for scheduling the execution of processes within a multi-processor computer system according to claim 5, wherein:

said processes having the same priority level are arranged in said run queue in a first-in-time order within said same priority level.

7. In a computer system including a plurality of processor nodes, each processor node including a plurality of tightly-coupled processors and cache memories associated therewith, an improved affinity process scheduling method whereby a process previously executed on a first processor node within said computer system is affined to said first processor node and will be scheduled for execution by said first processor node during a subsequent request for execution of said affined process, the improvement comprising the steps of:

receiving a request from a processor on a second processor node for a process to run, said second processor node having no currently runnable process which is affined with said second processor node;

monitoring the length of time said affined process has been waiting for execution by said first processor node when said affined process has been scheduled for execution; and     scheduling said affined process for execution with said second processor node when said length of time said affined process has been waiting for execution exceeds a predetermined "steal-age" threshold.

8. An improved affinity process scheduling method for a multiprocessor computer system, said affinity process scheduler for scheduling a process previously executed on a first processor node to said first processor node during a subsequent requests for execution of said process, the improvement comprising the steps of:

receiving a request from a processor on a second processor node for a process to run, said second processor node having no currently runnable process which is affined with said second processor node;

monitoring the processing load borne by said first processor node and determining therefrom a headroom parameter for said first processor node, said headroom parameter indicating the remaining load capacity of said first processor node; and     scheduling said affined process for execution with said second processor node when the headroom of said first processor node is less than a first predetermined "low-headroom" threshold.

9. An improved affinity process scheduling method for a multiprocessor computer system, said affinity process scheduler for scheduling a process previously executed on a specific processor node to said specific processor node during a subsequent requests for execution of said process, the improvement comprising the steps of:

monitoring the processing load borne by said affined processor node and determining therefrom a headroom parameter for said affined processor node, said headroom parameter indicating the remaining load capacity of said affined processor node; and     scheduling said affined process for execution with another available processor node when the headroom of said affined processor node is less than a first predetermined "low-headroom" threshold     wherein said step of scheduling said affined process for execution with another available processor node occurs when said available processor node has headroom greater than a second predetermined "low-headroom" threshold, said second low-headroom threshold being greater than said first low-headroom threshold.

\* \* \* \* \*